Nov. 12, 1940.　　　　C. B. MOORE　　　　2,220,974
AIR CONTROLLING INSTRUMENT
Filed April 28, 1938　　　2 Sheets-Sheet 2
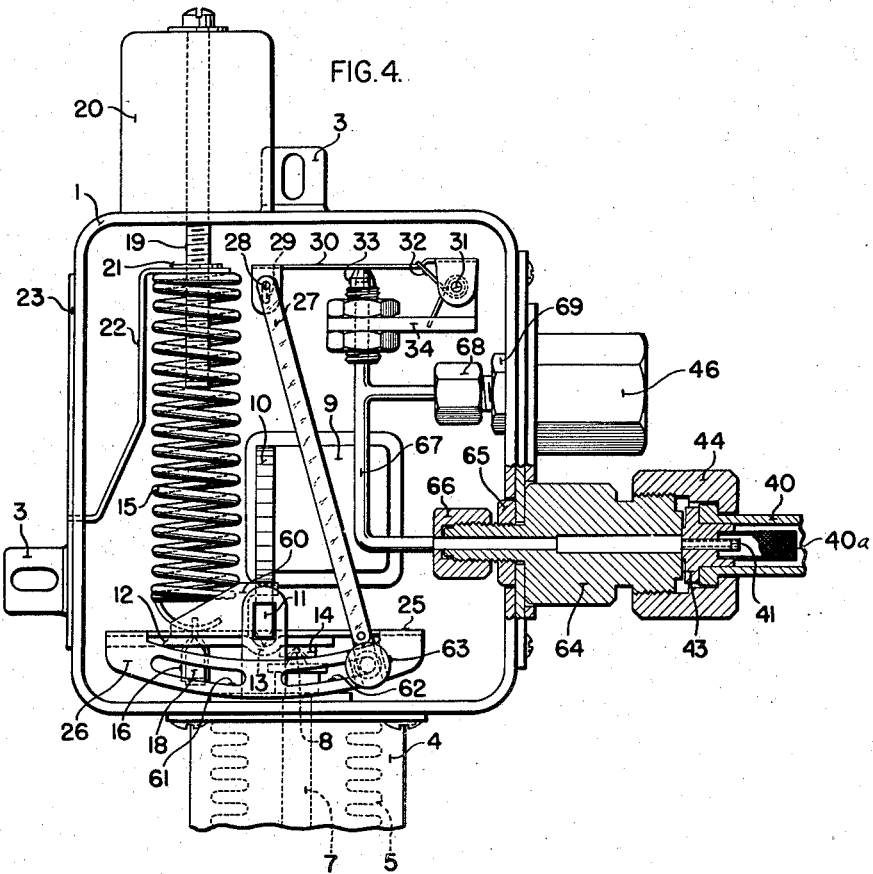
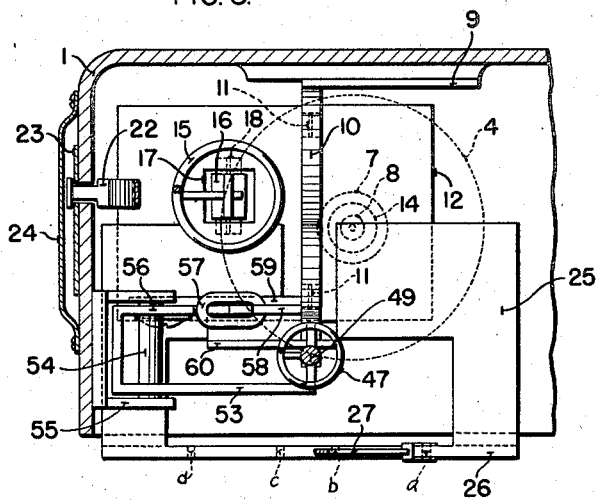
INVENTOR.
COLEMAN B. MOORE
ATTORNEY Patented Nov. 12, 1940

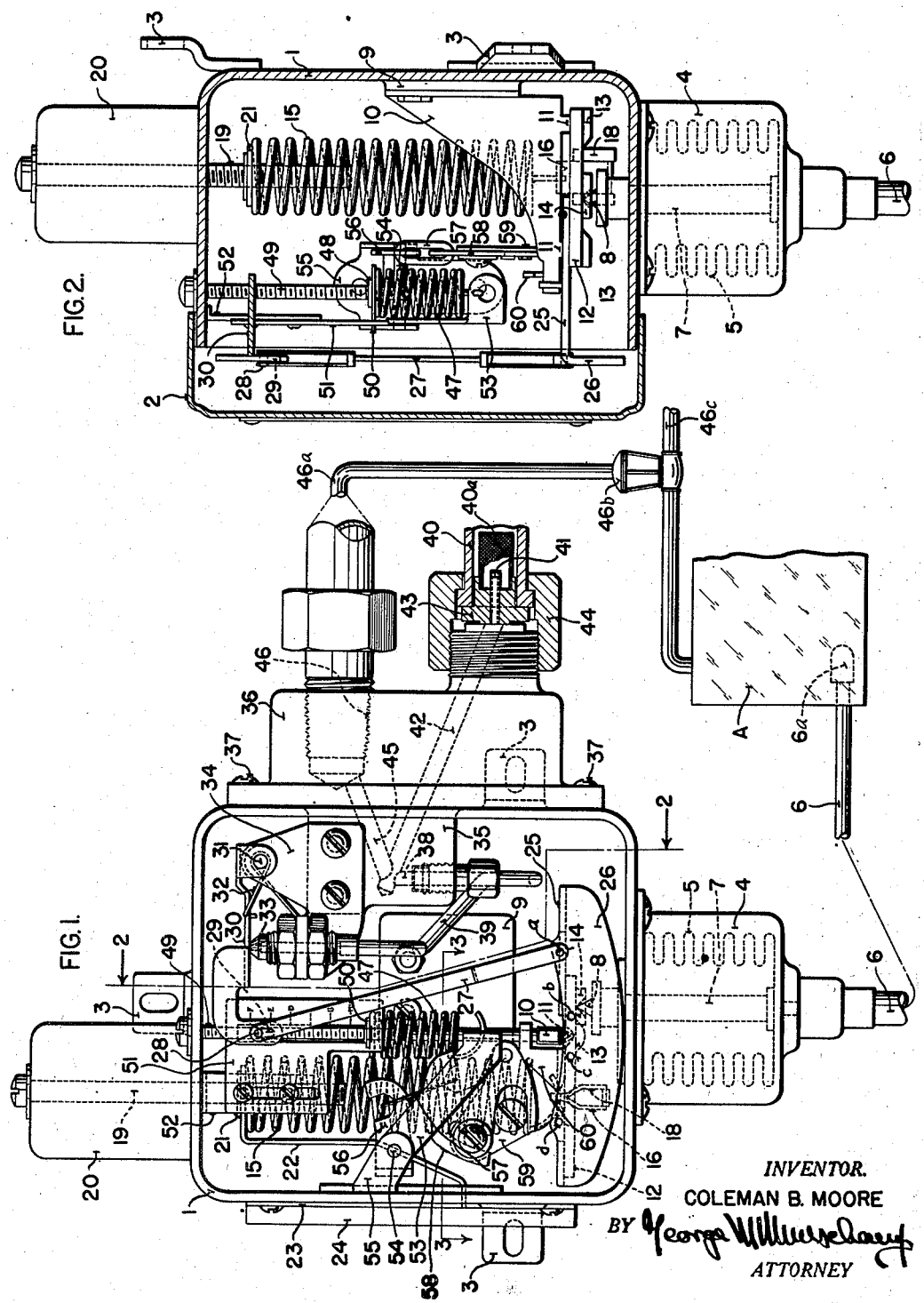

2,220,974

UNITED STATES PATENT OFFICE 2,220,974

AIR CONTROLLING INSTRUMENT

Coleman B. Moore, Carroll Park, Pa., assignor to
The Brown Instrument Company, Philadelphia,
Pa., a corporation of Pennsylvania Application April 28, 1938, Serial No. 204,920

9 Claims. (Cl. 137—153)

The present invention relates to control instruments, and more particularly the types that are generally referred to as air controllers.

In many industrial processes, it is customary to adjust various valves, dampers, rheostats, and other regulating apparatus, by means of air operated devices that are biased toward one position by some constant force. This force is opposed by a regulated source of air pressure that is varied in accordance with some condition that can be measured. The instrument which measures the condition and varies a controlling air pressure in accordance therewith is generally termed an air-controller and may take various forms according to the type of condition it is to measure, the manner in which the regulating apparatus is to be operated, and the character of condition to be controlled.

It is an object of my invention to provide a control instrument which may be responsive to a large number of variable conditions and which is versatile enough to be able to control practically any type of regulator.

It is a further object of my invention to provide a blind air-controller, or one in which no records or indications are made of the variation in the condition being measured and controlled. This control instrument is outstanding because of its small number of moving parts and the ease with which it can be assembled and adjusted.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a front view of one embodiment of my invention with the instrument casing cover removed;

Fig. 2 is a view taken on line 2—2 of Fig. 1;

Fig. 3 is a view taken on line 3—3 of Fig. 1; and

Fig. 4 is a front view of a simplified embodiment of the invention.

Referring to the embodiment of Fig. 1, there is provided a cup-shaped casing 1 of generally square form within which the apparatus of my invention is located. The casing is provided with a cover 2 and brackets 3 by which it may be attached to any convenient support.

Secured to the bottom wall of the casing 1 is a smaller casing 4 in which is located a pressure responsive element of any known type such as a bellows 5. The pressure is conducted to the casing 4 from any source, such as a bulb 6a in a container A, the condition of which is to be controlled, to act upon the bellows by means of a tubular connection 6. As the pressure in the casing 4 varies in response to changes in the condition being measured, the bellows 5 changes in length to raise and lower a bellows plunger 7 which is formed at its upper end with a conical bearing point 8. The movements of this plunger 7 are opposed by a spring, and the resulting movement of a lever is used to actuate the control mechanism.

Secured to the back wall of casing 1 is a supporting member 9 which extends forward as at 10 and has on its lower edge a pair of knife-edges 11. These knife-edges act as a fulcrum for a lever member 12 which is moved in response to pressure changes to which the bellows 5 is subjected. The lever member 12 is formed with depressions 13 in its upper side that receive the knife-edges 11 and, to the right of the depressions, has attached to its lower side a cup-shaped socket 14 to receive the bearing point 8 on plunger 7. The upward force of plunger 7 is balanced by a spring 15 to the lower end of which is fastened a member 16 that extends through an opening 17 in the lever 12. The member 16 has extending through it a knife-edge 18 that bears in depressions on the lower side of the lever 12 at the edges of opening 17.

Adjustment of the spring 15, so that it can balance various pressures imposed upon the bellows 5, is accomplished by a screw 19 whose head bears against the top of a hollow extension 20 on the top of casing 1. The lower end of screw 19 is received in a nut-member 21 that is attached to the upper end of the spring 15, so that by rotating the screw the spring 15 can be placed under more or less tension in opposition to the force of the bellows 5. A pointer 22 is fastened to nut-member 21 and has its lower end extending through a slot in the left wall of casing 1, where, in cooperation with a scale 23 on the side of the casing, it is used to indicate the setting of the spring 15. The scale 23 is protected by a transparent cover 24 and can, if desired, be calibrated in units of the condition that is being measured by the pressure imposed upon the bellows 5. Pointer 22 also acts to prevent the nut 21 from rotating as screw 19 is turned to adjust spring 15.

Movement of plate or lever member 12 around the knife-edge 11 in response to pressure changes in housing 4 is used to adjust a flapper valve with respect to a nozzle and thereby operate some suitable type of control device. To this end, a plate 25 that has its front edge turned downwardly as indicated at 26 is attached to lever 12 for movement therewith. The edge 26 is provided with four openings a, b, c, and d, in any one of which the lower, bifurcated end of a link 27 may be pivoted. As lever 12 is moved, its motion is imparted to the link 27 whose upper end has a pin 28, extending between the legs thereof, received in a slot 29 of a flapper valve 30 that is pivoted at 31 and is biased in a counter-clockwise direction by a spring 32.

The flapper 30 cooperates with a bleed nozzle 33 which is fastened to a small bracket 34 that is in turn attached to a block of some suitable material. The block consists of a single body of material having a small part 35 extending within the casing 1 through an opening in the right side thereof and a large part 36 on the outside of the casing and attached thereto in any suitable manner as by screws 37. The part 35 supports the bracket 34 to which the nozzle is attached and also upon which the flapper 30 is pivoted. This part is drilled at 38 to receive one end of a conduit 39, the other end of which communicates with the nozzle 33.

Air under constant pressure is supplied through a conduit 40, filter screen 40a, and a restriction 41 to a duct 42, drilled in parts 35 and 36, that communicates with duct 38. The restriction 41 is mounted in a washer 43 and along with the conduit 40 is attached in pressure-tight relation to part 36 by a collar 44. Ducts 38 and 42 communicate with a third duct 45 that is drilled through blocks 35 and 36 and terminates in a threaded connection 46 to which is adapted to be attached a conduit 46a leading to a controlled valve 46b or other apparatus which is responsive to variations in air pressure. As shown, the valve 46b controls the flow of a condition varying fluid in pipe 46c leading to container A.

In the operation of the device, if the value of the condition being measured is normal, the flapper 30 will be slightly spaced from nozzle 33 so that a predetermined amount of air can escape therethrough. Upon an increase in the value of the condition in container A, bellows 5 will be collapsed, moving plunger 7 upwardly and lever 12 in a counter-clockwise direction around knife-edges 11 against the force of spring 15. This motion will, through link 27 and pin 28, be transmitted to flapper 30 to raise the flapper and permit more air to escape through the nozzle 33. A consequent reduction in pressure will occur in the ducts 39, 38, 42 and 45, resulting in a reduction in pressure in connection 46 and the air operated apparatus 46b in communication therewith, to rectify the change in the measured condition in container A by varying the flow through pipe 46c leading thereto. In a similar manner, a reduction in the value of the measured condition will move link 27 downward, permitting spring 32 to move the flapper 30 nearer the nozzle 33 to build up pressure therein. This increase in pressure results in an increase in the pressure of connection 46 and the apparatus 46b in communication therewith.

In order to vary the throttling range, or the per cent movement of the total movement of lever 12 which is necessary to create the full change of the pressure range possible in apparatus 46b, a supplementary spring is provided that, upon movement of lever 12 from its normal position, progressively increases the effect of spring 15. The secondary spring 47 has a nut member 48 fastened to its upper end, which member is received on a screw 49 that has its head extending through and bearing on the top of casing 1. The nut member 48 has a pointer 50 on it that extends through a slot in a scale 51 which is attached to a bracket 52 fastened to the top of the casing. The scale is adapted to be adjusted along the bracket and then fastened in position. Spring 47 has its lower end extending through an opening in the lower end of one arm 53 of a U-shaped lever that is pivoted at 54 to a bracket 55 attached to the left side of casing 1. The other arm 56 of the lever has a notch in it that is connected by a link 57 to a notch in a member 58 that is adjustably fastened on a member 59 which is in turn attached to lever 12. Member 59 has its front end bent up as at 60 to extend over the front end of member 10.

The notch in arm 56 of the U-shaped lever and the notch in member 58 are so formed that they act as knife-edge pivots on each end of link 57. In this manner, the pull of spring 47 is transmitted through the U-shaped lever, link 57, member 58 and member 59, to the lever 12. In adjusting the instrument, the lever 12 is first moved to a position in which link 27 will hold flapper 30 the correct distance from nozzle 33. While the lever 12 is held in this position, member 58 is adjusted on member 59 until both ends of the link 57 and the point at which knife-edge 11 engages depression 13 are in line. With this adjustment, as shown in Fig. 1, the pull of the secondary spring 47 is toward the fulcrum of lever 12 when that lever is in its normal position, or at its control point, and therefore, the spring 47 will not exert any tilting force on the lever 12. If, however, lever 12 is tilted out of its normal position by an increase or decrease of pressure in chamber 4, the two ends of link 57 will no longer be in line with the knife-edge 11, so the force of spring 47 will be added to that of spring 15, and said force will increase with an increase of inclination of lever 12.

In this manner, pressure in chamber 4 will be opposed initially only by the force of spring 15, but at the instant the pressure in chamber 4 starts to change, the force of spring 47 will begin to add to that of spring 15 in a progressively increasing manner to oppose the pressure change. It should be noted at this point that spring 15 is of such a length that a maximum movement of the lever 12 will not be sufficient to have any effect on the force exerted by it; whereas spring 47 is of such stiffness that as lever 12 moves, the force exerted thereon by spring 47 will progressively increase as the lever moves.

From the above, it will be seen that if the nut 48 is moved down along scale 51, the force of spring 47 is diminished. Therefore, upon an increase in pressure in chamber 4, above that for which spring 15 is set, the lever 12 can move with practically no opposition from spring 47 and, through link 27, lift the flapper valve 30 from nozzle 33 to permit more air to escape therethrough and, consequently, reduce the control pressure to the controlled apparatus. Upon an increase in the length of spring 47, by adjusting nut 48 upwardly, a pressure increase in chamber 4 will still move lever 12, but it will take a larger increase to move the lever the same amount. Therefore, the throttling range has been increased, since it takes a greater pressure change in chamber 4 to produce a given movement of flapper 30.

The above-described operation of the device will be the same whether the link 27 is connected to lever 12 by either opening a or opening b which serve as factors in the adjustment of the throttling range. Assuming that the above-described operation has taken place while the link 27 was connected to lever 12 in opening a, it will then be obvious that if the link 27 was connected to lever 12 in opening b, that the pressure in chamber 4 to produce a given movement of flapper 30 would have to increase in proportion to the difference in length of the lever arms from knife-edge 11 to opening a and from knife-edge 11 to opening b. Thus, the openings a and b constitute a means for multiplying the throttling range of the instrument that is obtainable by adjustment of spring 47.

For a decrease in the pressure in chamber 4, a reverse of the above-described operations will take place. The spring 15 will move lever 12 clockwise and lower link 27 so that the spring 32 can move flapper 30 nearer to nozzle 33. This decreases the escape of air through the nozzle and will thereby build up pressure in connection 46 and the controlled apparatus. In this case, that is a decrease in pressure in chamber 4, the force of spring 47 will also add to that of spring 15 as the lever 12 moves. Continued downward movement of link 27 after the flapper 30 has engaged nozzle 33 will cause the pin 28 in its upper end to move idly in slot 29 of the flapper 30.

The above-described operation of the instrument is termed reverse acting; that is, a decrease in the measuring pressure produces an increase in the controlling pressure. In order to obtain an opposite action of the instrument and have it direct acting, that is to have increased measuring pressure produce an increased control pressure, it is only necessary to attach the link 27 to lever 12 by one of the openings c or d. This is true because openings c and d are to the left of the fulcrum point of lever 12 and move upwardly when the openings a and b, that are to the right of the fulcrum, move downwardly.

The embodiment of the invention disclosed in Fig. 4 is essentially the same as that disclosed in Figs. 1-3, but differs therefrom in the manner of adjusting the throttling range of the instrument and the manner of connecting the air lines to the instrument. Whereas the embodiment of the invention of Figs. 1-3 is capable of wide use, the embodiment of Fig. 4 is less complex in construction and is entirely suitable for many uses in which a limited throttling range adjustment is adequate.

In the following description, the same reference numerals have been used that were used in the above description for corresponding parts of the instrument.

In this embodiment of the invention, the throttling range of the instrument is adjusted by moving the lower end of link 27 toward or away from the pivot point of lever 12. To this end, the edge 26 of member 25, fastened to lever 12, is provided with two arcuate slots 61 and 62. The lower end of link 27 is provided with a thumb-screw 63 by which it can be adjustably secured in fixed relation to edge 26 along either of the slots 61 or 62. In this manner, the amount that link 27 is shifted, for a given movement of lever 12, may be varied.

Air under pressure is supplied through conduit 40 and restriction 41 to a member 64 which extends through an opening in the right side wall of the casing 1 and is fastened therein by a nut 65. Attached to the inner end of the member 64 by a collar 66 is a duct 67 that has two branches; one leading to the nozzle 33, and the other leading to connection 46 to which it is attached by a collar 68. The connection 46 is, in this case, attached to the side of casing 1 as is the member 64, that is by a nut 69.

The operation of this modification of the invention is the same as is that of Fig. 1. An increase in pressure in chamber 4 causes the lever 12 to move counterclockwise against the force of the spring 15. This in turn moves link 27 upward an amount, depending upon its distance from knife-edge 11, to move flapper valve 30 away from nozzle 33 and permit more air to escape therethrough. Such an increase in the escape of air through nozzle 33 causes a reduction of the air pressure in duct 66, connection 46, and the apparatus to be controlled.

The instrument that is disclosed herein is simple and versatile and is inexpensive to manufacture. There are only two adjustments; one, the adjustment of spring 15 to change the control point of the instrument, and two, the adjustment of the throttling range. Because of its inherent characteristics, this instrument has a very wide field of use.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a control instrument, a nozzle and a flapper therefor, a member connected to said flapper and adapted to move the flapper relatively to the nozzle, a pivoted lever to move said member, a condition responsive member to pivot said lever, and means to oppose the pivoting of said lever by said condition responsive member, said means consisting of a first part having a constant opposing force and a second part having a variable opposing force.

2. In a control instrument, a pivoted lever, means biasing said lever in one direction, a condition responsive element acting on said lever to oppose said biasing means and bring said lever to a normal position, said biasing means consisting of parts so constructed and arranged that the biasing force is varied as said lever moves out of normal position in either direction, a bleed nozzle, a flapper valve therefor, and means connected to said lever to relatively move said flapper and nozzle as said lever moves.

3. In a control instrument, the combination with a bleed nozzle and a flapper valve therefor, of a link to move said flapper relative to said nozzle, a pivoted lever, means adjustably connecting said link to said lever, a condition responsive element adapted to move said lever in response to variations in said condition, means opposing movement of said lever by said element, said means comprising a first spring of constant force and a second spring of variable force, and means to adjust said springs.

4. In a control instrument, the combination with a bleed nozzle and a flapper valve therefor, of means to move said flapper relative to said nozzle comprising a pivoted lever, a condition responsive element to move said lever upon changes in said condition, a spring to oppose movement of said lever by said element, a secondary spring, means connecting said secondary spring and said lever whereby at one position of said lever, said secondary spring will not exert any force thereon.

5. In a control instrument, the combination with a bleed nozzle and a flapper valve therefor, of a link to move said flapper relative to said nozzle, means to shift said link comprising a pivoted lever having a normal position for a normal relative position of said flapper and nozzle, a condition responsive element to move said lever, means opposing movement of said lever by said element with a constant force, and secondary means to oppose movement of said lever with an increasing force as said lever moves from its normal position.

6. In a control instrument, the combination with a bleed nozzle and a flapper valve therefor, of means to adjust said valve relative to said nozzle, said means comprising a pivoted lever having a normal position, a link extending between and pivoted to said lever and said valve, a condition responsive element to move said lever out of its normal position in response to changes of said condition, and a member of constant, but adjustable force to oppose the movement of said lever by said element.

7. In a control instrument, the combination with a bleed nozzle and a flapper valve therefor, of a pivoted lever adjustably connected to said flapper, a member biasing said lever in one direction with a constant but adjustable force, a condition responsive element to oppose the bias of said member and normally hold said lever in a predetermined position, a second member, means connecting said second member to said lever whereby upon movement of said lever from said predetermined position in one direction, it will oppose, and upon movement in the other direction, it will add to the force of said first member.

8. In a control instrument, the combination with a bleed nozzle and a flapper valve therefor, of a pivoted lever adapted to move said flapper upon movements thereof, a member to bias said lever in one direction, a condition responsive element to oppose said bias and normally hold said lever in a predetermined position but to permit movement of said lever upon changes in said condition, and means to oppose movement of said lever from said predetermined position with a force that increases with departure from said position.

9. In a control instrument, the combination with a bleed nozzle and a pivoted flapper valve therefor, of a pivoted lever having slots on each side of its pivot, a link pivoted at one end to said valve and pivoted at its other end to said lever, the pivot point being adjustable in one of said slots, a member biasing said lever in one direction with a substantially constant force, and a condition responsive element to oppose the bias of said member and normally hold said lever in a predetermined position.

COLEMAN B. MOORE.